(12) United States Patent
Strogov et al.

(10) Patent No.: US 12,724,912 B2
(45) Date of Patent: Sep. 1, 2026

(54) SYSTEMS AND METHODS FOR PERSISTENT FILE PROTECTION IN ENDPOINT DETECTION AND RESPONSE

(71) Applicant: Acronis International GmbH, Schaffhausen (CH)

(72) Inventors: Vladimir Strogov, Singapore (SG); Aliaksei Dodz, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 58 days.

(21) Appl. No.: 18/903,382

(22) Filed: Oct. 1, 2024

(65) Prior Publication Data

US 2026/0093835 A1 Apr. 2, 2026

(51) Int. Cl.
*G06F 21/62* (2013.01)

(52) U.S. Cl.
CPC .............................. *G06F 21/6218* (2013.01)

(58) Field of Classification Search
CPC ................................................ G06F 21/6218
See application file for complete search history.

(56) References Cited

U.S. PATENT DOCUMENTS

| | | | |
|---|---|---|---|
| 10,713,361 B2 | 7/2020 | Strogov et al. | |
| 11,436,328 B1 | 9/2022 | Strogov et al. | |
| 2024/0187427 A1 * | 6/2024 | Pettit | H04L 63/145 |

* cited by examiner

*Primary Examiner* — Baotran N To
(74) *Attorney, Agent, or Firm* — ESPE Legal Consultancy FZ-LLC

(57) ABSTRACT

Systems and methods of persistent file protection including determining an incident, intercepting a file operation in a kernel mode based on the incident, determining file information associated with a file to be modified by the file operation, storing the file information in a persistent file cache (PFC), tracking a file change between system shutdown and system restart, receiving a remediation action based on the incident, and performing remediation of the file using the file information stored in PFC.

20 Claims, 6 Drawing Sheets

| Byte Range | Description |
|---|---|
| 0~3 | Size of this journal entry |
| 4~5 | Major version |
| 6~7 | Minor version |
| 8~15 | File reference of file that caused this entry |
| 16~23 | Parent directory file reference for file that caused this entry |
| 24~31 | USN for entry |
| 32~39 | Timestamp |
| 40~43 | Flags for type of change |
| 44~47 | Source information |
| 48~51 | Security ID (SID) |
| 52~55 | File attributes |
| 56~57 | Size of file name |
| 58+ | File name |

FIG. 3

| Value | Description |
|---|---|
| 0x00000001 | The default $DATA attribute was overwritten |
| 0x00000002 | The default $DATA attribute was extended |
| 0x00000004 | The default $DATA attribute was truncated |
| 0x00000010 | A named $DATA attribute was overwritten |
| 0x00000020 | A named $DATA attribute was extended |
| 0x00000040 | A named $DATA attribute was truncated |
| 0x00000100 | The file or directory was created |
| 0x00000200 | The file or directory was deleted |
| 0x00000400 | The extended attributes of the file were changed |
| 0x00000800 | The security descriptor was changed |
| 0x00001000 | The name changed—change journal entry has old name |
| 0x00002000 | The name changed—change journal entry has new name |
| 0x00004000 | Content indexed status changed |
| 0x00008000 | Changed basic file or directory attributes |
| 0x00010000 | A hard link was created or deleted |
| 0x00020000 | Compression status changed |
| 0x00040000 | Encryption status changed |
| 0x00080000 | Object ID changed |
| 0x00100000 | Reparse point value changed |
| 0x00200000 | A named $DATA attribute was created, deleted, or changed |
| 0x80000000 | The file or directory was closed |

FIG. 4

SYSTEMS AND METHODS FOR PERSISTENT FILE PROTECTION IN ENDPOINT DETECTION AND RESPONSE

TECHNICAL FIELD

Embodiments relate generally to endpoint detection and response (EDR) systems. More particularly, embodiments relate to remediation schemes for EDR systems.

BACKGROUND

Traditional EDR systems implement remediation or recovery only during a live computing session. As a result, data is typically lost after the system restarts. For example, traditional EDR systems are generally unable to detect file modifications after a system restart because they are "unaware" of certain data that occurred before the restart. One existing solution includes MICROSOFT VSS-based remediation. However, VSS-based remediation can be quite costly because it requires freezing file system activity and other system components for a certain period of time.

Therefore, there is a need for systems and methods that provide efficient persistent file protection, including for remediation or recovery after system reboot.

SUMMARY

Embodiments described or otherwise contemplated herein substantially meet the aforementioned needs of the industry. In an embodiment, systems and methods for persistent file protection are provided. In one aspect, integration with an EDR system supports EDR response actions for "file deletion" system incidents and "file deletion with quarantine" system incidents. Embodiments are particularly configured for remediation or recovery after system reboot.

In a feature and advantage of embodiments, ransomware protection is seamlessly integrated into EDR file remediation, such as on local persistent file cache. In one aspect, a cyber protection service provides ransomware to an actively protected device external to the cyber protection service, and thus protects the local memory of the device.

In another feature and advantage of embodiments, EDR systems support remediation of a file between device sessions. In one aspect, a persistent mode tracks that there were no modifications of the file between sessions, such as a first live session while a computing device is operating, device reboot, then a second live session after reboot.

In another feature and advantage of embodiments, file storage is optimized. In an embodiment, systems and methods track and save only modified parts of a file by saving maps of the original contents of modified parts of the file in persistent cache. As a result, file storage is improved over traditional systems and methods, which generally store the entire modified file.

In another feature and advantage of embodiments, real-time on-access snapshotting is optimized. In an embodiment, systems and methods perform snapshotting by capturing only the original content of modified parts of the file, rather than the modified parts themselves. This approach allows real-time on-access snapshotting to be executed much faster, as it is a more frequent operation than remediation. As a result, the system can handle file modifications more efficiently, with reduced computational resources and minimal impact on performance.

In an embodiment, a method of providing persistent file protection for a computing device comprises intercepting a file operation for a file in a kernel mode; determining file information associated with the file to be modified by the file operation, wherein the file information includes at least one of a file identifier, a file path, a file hash, a map of file extent locations, a file attribute, and an original file extent; storing the file information in a persistent file cache (PFC), the PFC configured to store historical file operation information and comprising: a session cache portion that invalidates after computing device restart, and a persistent cache portion; determining an incident associated with the file by an endpoint detection and response (EDR) manager; after the computing device restarts: tracking, in an update sequence number (USN) journal, a file change between computing device shutdown and computing device restart by enumeration of the USN journal to identify the file change, tracking a volume-level file allocation map by comparing a current file allocation map with the file allocation map stored in the persistent cache portion, and validating the volume-level file allocation map (in some aspects, by comparing a hash stored in the persistent cache portion and an actual hash of the file), receiving, from the EDR engine, a remediation action including a request to remediate the file, wherein the request is based on the incident; and performing remediation of the file using the file information stored in the persistent cache portion.

In an embodiment, system for persistent file protection comprises a persistent file cache (PFC), which can be realized in either user mode or kernel mode, depending on performance and communication optimization, the PFC configured to store historical file operation information and comprising: a session cache that invalidates after computing device restart, and a persistent cache; at least one processor and a memory and operably coupled to the at least one processor; instructions that, when executed by the at least one processor, cause the at least one processor to implement: an EDR manager configured to determine an incident on a computing device, an EDR driver configured to intercept a file operation in a kernel mode based on the incident, a persistent file cache (PFC) configured to store historical file operation information and comprising: a session cache portion that invalidates after system restart, and a persistent cache portion, a cache logic engine configured to store evidence of a file change between system shutdown and system restart on the persistent cache portion, a remediation engine configured to receive, from the EDR manager, a remediation action including a request to remediate the file, wherein the request is based on the incident and perform remediation of the file using the file information stored in the persistent cache portion by instructing one or more remediation handlers, and a file protector configured to determine the file change.

In an embodiment, a file protector implemented in kernel mode comprises instructions that, when executed by at least one processor, cause the file protector to provide persistent protection of a file, including: comparing file information for the file stored in a persistent file cache (PFC) to an update sequence number (USN) journal; identifying a change to the file between system shutdown and system restart based on the compare; conducting a hash comparison by: hashing a volume-level file map including a file extent before restart as a pre-restart hash and storing the pre-restart hash in the PFC, and upon restart, hashing the volume-level file map as a post-restart hash, comparing the pre-restart hash and the post-restart hash; and determining continuity tracking can resume safely based on the hash comparison.

BRIEF DESCRIPTION OF THE DRAWINGS

Subject matter hereof may be more completely understood in consideration of the following detailed description of various embodiments in connection with the accompanying figures, in which:

FIG. 3 is an example data structure for attribute entries in a USN journal, according to an embodiment.

FIG. 4 is example data for the USN journal of FIG. 3, according to an embodiment.

DETAILED DESCRIPTION

Figure 1:
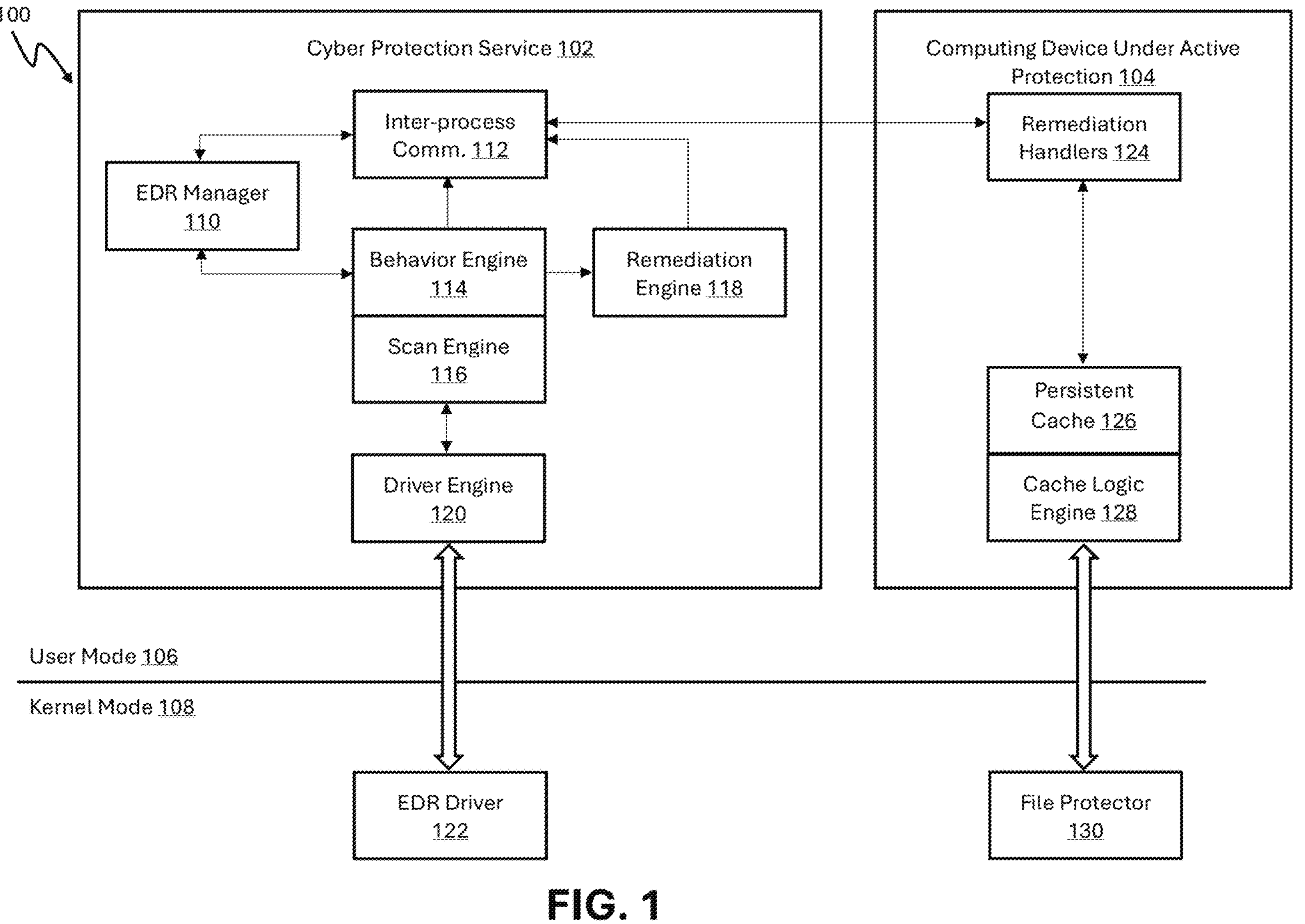
FIG. 1 is a block diagram of a system for persistent file protection, according to an embodiment.

Embodiments described herein include systems and methods for ransomware protection configured for integration with EDR file remediation. In an embodiment, integration is unnoticeable by the user such that existing components on the active protection (e.g. user's device) are utilized with the new service protection components described and contemplated herein. EDR-oriented file remediation is thereby provided.

In an embodiment, systems and methods track modified parts of the file using maps. In particular, a given map is stored such that only the original values of modified parts of the map are saved. More particularly, embodiments save the maps and remember only the original values of the modified parts of the map. Remediation can then utilize the original data of modified parts, and not the modified parts of the original file.

Systems and methods provide a persistent mode for file protection. In an embodiment, an update sequence number (USN) journal stored in a special directory in the Windows file system is used to track any file changes between system shutdown and system restart by enumeration of the USN journal to identify the file change. Enumeration refers to the systematic process of reading and analyzing each entry in the USN journal to detect changes relevant to the files being protected. The USN change journal provides a log of all changes made to files on the volume. As files, directories, and other NTFS objects are added, deleted, and modified, NTFS enters records into the USN change journal, one for each volume on the computer. Each record indicates the type of change and that the object changed. New records are appended to the end of the journal stream.

In an embodiment, a volume-level file allocation map can be utilized for persistent file protection by comparing a current file allocation map with a file allocation map stored in the persistent cache. For example, an allocation map, a collection of extents (runs), is the sequence of data ranges that maps file virtual offsets to contiguous volume data ranges (runs/extents). In one aspect, volume-level topology comparisons can be made between maps to validate changes by assessing whether extents have moved or been altered. For instance, if a defragmentation process has occurred, this can result in certain extents being shifted to different physical locations. Such changes, while normal in some cases, may pose a risk of data loss or corruption if critical extents have been affected in a manner that prevents remediation. As a result, detecting shifts in extents is important for determining whether the file can be safely remediated. This comparison guarantees that file integrity is preserved, even when the extents are reorganized during operations such as defragmentation.

In one aspect, topology comparisons can be made between maps to validate changes. Topology comparisons focus on the start and end points of extents, which represent continuous extents (runs) of a file on the volume at the storage stack level. Changes in topology, such as shifts in the location or size of extents, can indicate a potential invalidation of the file's content for remediation purposes. For example, if the extents have been moved due to defragmentation or other processes at the volume stack level, the integrity of the file may be compromised. However, in certain cases, even if the topology has changed, the extents required for remediation remain unaffected, allowing the remediation to proceed successfully. Therefore, detecting and evaluating changes in the topology of extents can be utilized for determining whether the file can still be remediated.

In one aspect, structure comparisons can be made between maps to validate changes. Structure comparisons involve examining the detailed attributes and properties of the file allocation within the volume. This can include comparing metadata such as file allocation tables, directory structures, or specific file system attributes (e.g., last time of modification) that are stored within the allocation maps. For instance, a structure comparison can indicate that file's permissions were altered or that timestamps do not match between the current and cached maps, signaling a potential unauthorized access or modification. Structural changes can affect the validity of the file for remediation, depending on the extent or type of the modifications.

In certain cases, despite changes in the topology of file extents, the system may still be able to proceed with remediation. This is possible when the extents that are critical for remediation remain unchanged, even if other extents have been moved or modified. For example, a defragmentation process may shift some parts of a file's extents, but as long as the extents required for remediation are intact, the file can still be reconstructed and restored. In this way, even though the overall topology has changed, the unchanged portions of the file's extents can be used to complete the remediation process.

In an embodiment, block cloning can be used for persistent file protection. Block cloning instructs the file system to copy a range of file bytes on behalf of an application, where the destination file may be the same as, or different from, the source file. Block cloning performs copies as a low-cost metadata operation rather than reading from and writing to file data. In an embodiment where the file system enables multiple files to share the same logical clusters (physical locations on a volume), copy operations only need to remap a region of a file to a separate physical location, converting an expensive, physical operation to a quick, logical one. Effectively, block cloning uses pointers to already existing blocks instead of copying or re-creating blocks. For example, to determine a difference between files, a first clone can be commanded and record stored in persistent file cache, and a second clone can be commanded and compared against the first clone.

In an embodiment, a volume-level file map can be utilized for persistent file protection by comparing hashes of file extents stored in the persistent file cache with the actual hash of the file extents after a system restart to ensure the file has not changed. For example, a volume-level file map can be hashed before the restart, with the hash stored in the persistent file cache. Upon restart, the extents of the volume-level file map are hashed again, and the pre-restart hash is compared with the post-restart hash to determine any changes. If the hashes match, the extents can be safely utilized for remediation.

In one aspect, at the volume filter level, a map can be obtained from the file filter. In an embodiment, a file is characterized by this set of extents of the map. Accordingly, at the level of the volume, when an operation is identified that modifies a piece or the entire file, the map is maintained in its current state. That is, the old data of the changed pieces are stored. More particularly, at the place where a given file existed, the old content is extracted, put in storage, and then, those parts of the file that were not modified are collected from these pieces of the storage and pieces of the volume, such as unchanged extents of the file, or pieces of extents, or multiple extents. Accordingly, based on the fact that there are changes in specific sectors belonging to these extents, the original data of these changed sectors in the storage corresponding to this file are already stored and can be utilized.

In an embodiment, a master file table (MFT) can be utilized for persistent file protection. For example, a file system can include a data structure (e.g. file) as an MFT. The MFT includes at least one entry for every file on a file system volume, including the MFT itself. In an embodiment, information about a file, including its size, time and date stamps, permissions, and data content, is stored either in MFT entries, or in space outside the MFT that is described by MFT entries. For small files, the data can reside entirely within the MFT, and in such cases, the MFT record itself can be stored in the persistent file cache for later use in remediation. When the file is large, its data is on a cluster on device storage (e.g. hard drive). This location is stored within the MFT. In some cases, the MFT record can be copied to the persistent file cache (e.g., one or four kilobytes of data) to efficiently handle remediation. The comparison between MFT records is used to verify whether stored data in the cache can be used for remediation.

In one aspect, the entire MFT or a portion of it can be used for validation purposes. For instance, the MFT can be used to confirm that the file itself is present in the file system (e.g., by verifying File ID, name, or other attributes). By comparing the file's identifier and the revision count (e.g., SequenceNumber) saved in the persistent file cache with those in the MFT, it can be determined if the file's data stored in the cache remains valid for remediation. In some cases, such as with NTFS volumes, small files are fully contained within the MFT records. However, different file systems, such as ReFS, may rely on volume allocation maps or other structures for file tracking. In ReFS, data retrieval and verification may involve more complex methods, such as using allocation keys stored in B-trees. The verification process for file systems like NTFS involves checking MFT records, while for ReFS or other systems, alternative approaches such as allocation maps may be required.

In an embodiment, certain components described above can be used together. In an example, for example, in a reboot case a USN record is checked for an at-issue file. If the file is found in the USN record, the file is to be invalidated because it cannot be used for continuous tracking. In particular, the USN Journal logs all changes to files, including modifications, renaming, creation of hardlinks, and more. When a file appears in the USN record, it indicates that some form of change has occurred in the file system since the last tracking session. If such a change is detected, the file can no longer be relied upon for continuous tracking because these changes could affect its structure, content, or metadata. This is particularly critical in cases of security concerns, where even minor changes may signal potential tampering or corruption. In one aspect, specific changes like renaming or even certain metadata modifications might not necessarily affect tracking, but more dangerous changes, such as encryption or compression, can compromise the integrity of tracking. Therefore, invalidating the file when a USN record is detected avoids reliance on potentially altered data.

If no USN record is found, no detectable changes were made, and embodiments can proceed to use extents and file topology to verify file integrity. In particular, hashes of unchanged file sections (extents/runs) can be compared. If the hashes match, the file has not been altered in a way that would disrupt tracking, and thus, continuity tracking can be resumed safely.

For tiny MFT files, resident data or file operation data can be used as the source of remediation data. In one aspect, the MFT resident file Revision Count can be used as a safeguard check. In embodiments, a particular approach of continuity tracking can be implemented if the file extents topology has changed, but runs/extents of not modified parts of the file are still at the same locations and their hashes are the same.

Referring to FIG. 1, a system 100 for persistent file protection is depicted, according to an embodiment. System 100 generally comprises a cyber protection service 102 and computing device 104 under active protection by cyber protection service 102.

System 100 includes components that operate both in a user mode 106 and a kernel mode 108. In kernel mode 108, the executing code has complete and unrestricted access to the underlying hardware. Code in kernel mode 108 can execute any CPU instruction and reference any memory address. Kernel mode 108 is generally reserved for the lowest-level, most trusted functions of the operating system. In user mode 106, the executing code has no ability to directly access hardware or reference memory. Code running in user mode 106 must delegate to system APIs to access hardware or memory.

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware.

An engine can itself be composed of sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine. Likewise, in other contemplated embodiments, multiple defined functionalities can be implemented by a single engine that performs those multiple functions, possibly alongside other functions, or distributed differently among a set of engines than specifically illustrated in the examples herein. In one example, the engines described herein are executed by a processor (e.g. an ASIC) according to instructions stored on memory operably coupled to the processor.

Cyber protection service 102 generally comprises an EDR manager 110, an inter-process communication (IPC) engine 112, a behavior engine 114, a scan engine 116, a remediation engine 118, and a driver manager 120 for coordination of EDR driver 122.

EDR manager 110 is configured to process event data to identify potential security threats and suspicious activities on computing device 104. In an embodiment, EDR manager 110 can receive event data indicative of various activities of computing device 104, including process executions, registry modifications, network connections, system configuration changes, and user interactions. Event data can include telemetry data, such as logs, event records, system calls, network traffic, registry changes, and the like.

In an embodiment, EDR manager 110 utilizes persistent cache 126 to extract information for remediation purposes. For example, EDR manager 110 can request data of persistent cache 126 related to the particular remediation selected for the particular file(s) at issue, in accordance with remediation engine 118 and remediation handlers 124, using inter-process communication engine 112.

IPC module 112 comprises a controller for external programming for EDR manager 110 that allows for external control applications such as on computing device 104. In an embodiment, IPC module 112 can communicate with computing device 104 (e.g. certain remediation handlers, as will be described) via AP_PROXY instruction.

Behavior engine 114 is configured to recognize and interpret behavioral patterns and activity sequences to identify normal activity (e.g., baseline system behavior) and deviations that may indicate potential security threats. Behavioral analysis by behavior engine 114 can involve machine learning algorithms, statistical models, and heuristics to detect suspicious or anomalous behavior. By analyzing relationships between different events and entities, behavior engine 114 allows for complex attack scenarios, lateral movement, and persistent threats to be identified.

In one aspect, behavior engine 114 is configured to analyze the behavior of software and systems to detect abnormal or suspicious activities that may indicate the presence of malware or security breaches. For example, behavior engine 114 can recognize malicious patterns of behavior indicative of predefined malware. Once a threat is identified, the threat can be remediated. In an embodiment, behavior engine 114 can command a remediation controller (e.g. remediation engine 118) via proprietary EDR_REMEDIATION_CONTROLLER instructions.

Scan engine 116 can be a scanning and rules engine configured to, for example, perform network security scanning and/or web application scanning according to certain logic rules. In some implementations, scan engine 116 can conduct comprehensive scans of network infrastructure (e.g., routers, switches, firewalls, and servers) to identify vulnerabilities, misconfigurations, and potential security risks. In some implementations, scan engine 116 can assess the security posture of web applications by scanning for common vulnerabilities, such as SQL injection, cross-site scripting (XSS), and insecure authentication mechanisms. Scan engine 116 results can be utilized by behavior engine 114.

Remediation engine 118 is a remediation controller configured to implement response actions. For example, remediation engine 118 facilitates response actions to mitigate security incidents and contain threats on the endpoint. Depending on the severity of the threat and the organization's security policies, response actions may include isolating the endpoint from the network, terminating malicious processes, quarantining files, rolling back system changes, and/or alerting security operations personnel for further investigation and remediation. In an embodiment, remediation controller 118 can communicate with IPC module 112 (for further interaction with computing device 104) via AP_PROXY instruction.

Driver engine 120 is a driver manager configured to support EDR service workflow and execution of cyber protection service 102 (e.g., by instructing and receiving data from EDR driver 122).

EDR driver 122 is an agent deployed to monitor and analyze system activities in real-time. EDR driver 122 operates at a foundational level within the operating system, allowing it to capture and interpret events, processes, network connections, file operations, and other activities occurring on computing device 104. For example, EDR driver 122 is configured to monitor operations and functions that interact directly with hardware resources of computing device 104.

In an embodiment, EDR driver 122 is a device driver configured to communicate through a computer bus or communication subsystem connected to hardware of computing device 104. In such embodiments, EDR driver 122 can be hardware dependent and operating-system specific. For example, EDR driver 122 can provide abstraction by acting as a translator between computing device 104 and higher-level applications. The presence of EDR driver 122 between the hardware and application levels can allow for more granular monitoring and control of system activities, providing a higher level of security and responsiveness. For example, EDR driver 122 can implement kernel-level file system hooks, network stack integration, and memory scanners.

In an embodiment, EDR driver 122 is a software driver configured to provide a programming interface to control and manage specific lower-level interfaces that are often linked to a specific type of hardware, or other low-level service. A software-level EDR driver 122 can operate at a higher level than kernel-level implementations, focusing on integrating with the operating system through APIs and user-space processes. By focusing on user-space and leveraging existing OS APIs and libraries, software-level EDR drivers provide a flexible and less complex approach to endpoint security compared to kernel-level implementations.

EDR driver 122 is configured to capture data, according to embodiments. In an embodiment, EDR driver 122 monitors telemetry data from computing device 104, for example, including system logs, registry changes, file modifications, network traffic, and other relevant information. EDR driver 122 can send captured data to cyber protection service 102 via driver engine 120.

Computing device 104 generally comprises remediation handlers 124, persistent cache 126, and cache logic engine 128.

Remediation handlers 124 implement the specific remediation defined by remediation engine 118. In an embodiment, remediation handlers 124 are configured for the particular computing operations defined by a particular remediation. For example, in remediation including isolating the endpoint from the network, remediation handlers 124 can be configured with network I/O access and port blocking or disabling capability. In another example, in remediation including terminating malicious processes, remediation handlers 124 can be configured with file system permissions to kill or disable the process. In another example, in remediation including quarantining files, remediation handlers 124 can be configured for defining a quarantine, such as a computing hardware or software location and file system permissions to place the particular file in the defined location. In another example, in remediation including rolling back system changes, remediation handlers 124 can be configured to access one or more system backups (e.g. via database not depicted in FIG. 1) and execute system rollback to a given backup. In another example, in remediation including alerting security operations, remediation handlers 124 can be configured with graphical user interface (GUI) components, or other I/O components, such as messaging or reporting capabilities to indicate the given alert.

In one aspect, when a file is being remediated, the file can be recreated from portions of the file left untouched on storage, plus the original portions of those that have been modified. Effectively, a file can be digitally sewn together from these portions. Advantageously, embodiments conserve storage on restoration data.

Persistent cache 126 is data storage that is configured for storing data persistently across system restarts, ensuring that frequently accessed data remains available even after a reboot. In an embodiment, persistent cache 126 resides in user mode 106 (as illustrated in FIG. 1). In another embodiment, persistent cache 126 resides in kernel mode 108. In certain other embodiments, persistent cache 126 resides in both user mode 106 and kernel mode 108. The implementation location of persistent cache 126 can be based on particular optimization goals, such as overhead, communication, and other performance criteria.

In an embodiment, persistent cache 126 comprises a persistent file cache (PFC). In one aspect, PFC comprises historical file operation information. For example, historical file operation information can include logs of file creation, modification, and deletion events that occurred during previous system sessions. Accordingly, details such as the timestamps of these operations, the user or process responsible for the changes, and the specific attributes of the files affected (e.g., size, permissions, and location on disk) are tracked. In another example, the PFC can store historical information about file access patterns, such as which files were frequently read or written to during certain periods. This data can be valuable for detecting unusual behavior, such as a sudden increase in access to sensitive files, which might indicate a security threat. Additionally, the PFC can record metadata changes, such as alterations to file properties (e.g., renaming, attribute changes) and track the sequence of operations performed on specific files. In one aspect, PFC comprises a session (non-persistent) cache portion that invalidates after restart of the system, and a persistent cache portion that does not invalidate after restart of the system. During a single user session, the session portion of the cache may store temporary data related to ongoing file operations, such as recently accessed files, active network connections, or in-progress file transfers. This data is important for improving performance during that session, allowing the system to quickly retrieve and process information without having to repeatedly access the underlying storage. Meanwhile, the persistent portion of the cache can store critical data that needs to survive across system restarts, such as logs of file modifications, security policies, or metadata changes. For instance, if a file was modified just before a system restart, the persistent cache retains information about that modification, ensuring that the system can detect and respond to the change when it comes back online. The session and persistent portions can work together when, for example, a user modifies a file during a session. The details of the modification (such as timestamp and user ID) can initially be stored in the session portion for quick access. However, as the session progresses, this information can be periodically transferred to the persistent portion to guarantee that it is not lost if the system restarts unexpectedly. Additionally, if a system is undergoing a scheduled shutdown, the system can migrate relevant data from the session portion to the persistent portion before the shutdown, guaranteeing that all important information is preserved. Upon restart, the system can then use the persistent portion to restore the state of certain files or processes, while the session portion resets to handle new data for the current session.

In one embodiment, the persistent cache portion is valid after any number of system restarts. In another embodiment, the persistent cache portion is valid after a certain number of system restarts (e.g. a quota), then invalidates after the quota.

In an embodiment, EDR manager 110 can provide rules for session storage and persistent cache portion storage to optimize persistent cache 126 (as implemented by, for example, cache logic engine 128). For example, the data stored in persistent cache portion can be minimized to reduce storage obligations of computing device 104. In an embodiment, only portions of the data stored in persistent cache portion are replaced instead of storage of entire updated copies.

Cache logic engine 128 is configured to support persistent cache 126 operations. For example, cache logic engine 128 can read from and write to persistent cache 126 according to certain logic. In an embodiment, cache logic engine 128 is utilized to store and compare the particular values in persistent cache 126 for the persistent file protection embodiment implemented by cyber protection service 102.

Cache logic engine 128 can implement persistent cache storage based on one or more storage rules. The storage rules can include at least one of mask rules, importance rules, or directory rules. These rules allow the system to selectively log call information based on predefined criteria, optimizing storage and processing efficiency.

Mask rules can specify which parts of data should be stored and which parts can be skipped. For example, mask rules can specify that only registry call information related to security settings or critical system configurations is logged, while routine or non-essential registry call information is excluded from storage. As another example, mask rules can include techniques used to obfuscate, anonymize, or redact sensitive data to protect it from unauthorized access. In another example, importance values can be provided for certain data sources or certain data to store relatively more important data than less important data. For example, "high" importance data can be stored instead of "low" importance data. In another example, data from certain directories can be prioritized. Directory storage rules policies for replicating data from EDR driver 122 source to persistent cache 126 based on directory information. File protector 130 operates at kernel mode 108 level to implement remediation handler 124 kernel operation and/or cache logic engine 128 operations. For example, as discussed above, certain remediation handler 124 operations use kernel-level operations, such as file system and network socket handling. In another example, file protector 130 can implement or retrieve kernel-level data related to information stored in persistent cache 126.

In an embodiment, file protector 130 comprises instructions to execute the tracking and validating described herein, including the review of USN journal, comparison of file allocation maps, validating volume-level file maps, or comparing MFT resident files, etc. In one aspect, file protector 130 is configured to determine the file change. In one aspect, file protector 130 is configured to track an update sequence number (USN) journal to identify the file change by enumeration of the USN journal. In one aspect, the file protector is configured to track a volume-level file allocation map to identify the file change by comparing a current file allocation map with a file allocation map stored in the persistent cache portion. In one aspect, the file protector is configured to validate the volume-level file allocation map by comparing a hash stored in the persistent cache portion and an actual hash of the file (e.g. the file's extent). In one aspect, after a computing device restarts, for unmodified extents, validation includes comparing the topology (beginning and end) and hash to ensure consistency. For modified extents, validation is based on topology (beginning and end points), and remediation is performed using the data from the persistent file cache (PFC). Such validation guarantees the tracking can continue for the modified portion. In one aspect, the file protector is further configured to ensure continuity of the evidence of the file change by comparing master file table resident files to the file information stored in the persistent cache portion.

In an embodiment, EDR manager 110 is further configured to pass a policy to system components based on the incident. For example, when creating or otherwise determining an incident, EDR manager 110 can define certain data handling, including retrieval (e.g. from EDR driver 122), communication (e.g. via IPC engine 112), behavior analysis and scanning (e.g. via behavior engine 114 and scan engine 116), or remediation (e.g. via remediation engine 118). Accordingly, data handling can be incident-specific or file-specific.

In one aspect, persistent cache 126 can communicate only meta-data related to the data stored in the persistent cache portion of the PFC to EDR manager 110, such as data related to the snapshots, maps, or files. In another aspect, the data from persistent cache 126 can be communicated to EDR manager 110.

Figure 2:
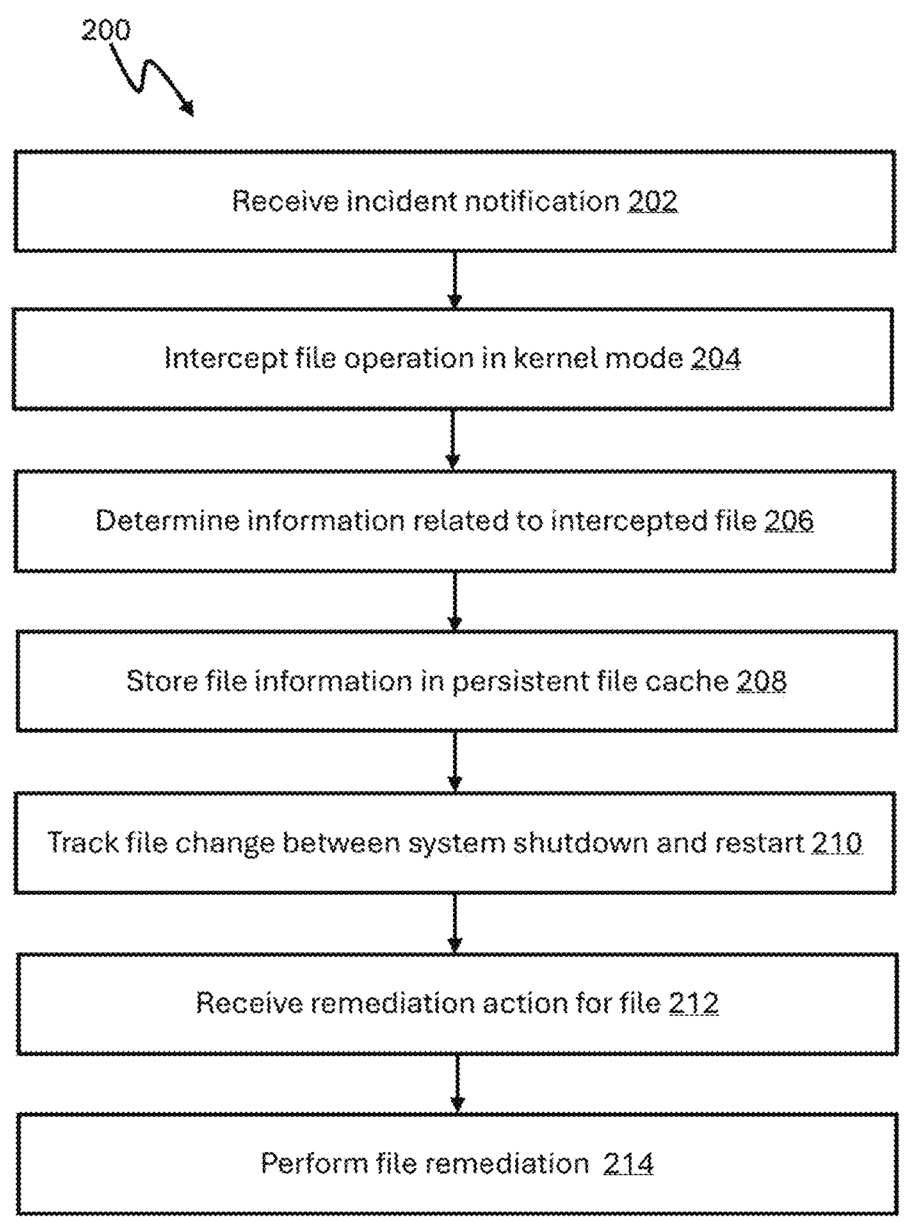
FIG. 2 is a flowchart of a method of persistent file protection, according to an embodiment.

Referring to FIG. 2, a method 200 of persistent file protection is depicted, according to an embodiment. In an embodiment, method 200 can be implemented by system 100.

At 202, a notification of an incident from an endpoint detection and response (EDR) engine is received. For example, EDR manager 110 can receive (or itself determine) indication of a potentially malicious process or thread associated with or on computing device 104. Incident data can include a process or thread identifier, and/or other data or metadata associated with the process or thread. In an embodiment, notification of an incident can include a time-stamped incident start time. At an incident start time, any first modification for a specific file that is included in the incident initiates getting a file map, which can then be used for comparisons described herein.

At 204, a file operation related to the incident is intercepted in kernel mode. For example, EDR manager 110 can instruct, via driver engine 120, EDR driver 122 to intercept a file operation in kernel mode 108. In another aspect, the file operation is creation of a new file. In one aspect, the file operation is modification of an existing file (e.g. writing to the file or writing operation). In one aspect, the file operation is deletion of an existing file. In an embodiment, the incident start time value can be used to capture given operations before or after the incident start time, or in coordination with the incident start time (such as at the incident start time).

At 206, file information associated with the file to be modified by the file operation is determined. In an embodiment, file information can include a file identifier, a file path, a file hash (e.g. of the entire file or hash of a file extent), a map of file extent locations (e.g. volume-level, TOM location), a file attribute, an original file extent, or sector content.

In one example, an extent is a contiguous area of storage reserved for a file in a file system, represented as a range of block numbers, or tracks on count key data devices. Put another way, every single piece of file that is on a storage is called an extent. A chain of such extents makes up a whole file and reflects the fragmentation of the file.

A FSCTL_GET_RETRIEVAL_POINTERS operation retrieves a variably sized data structure that describes the allocation and location on disk of a specific file. The below structure is the output for the FSCTL_GET_RETRIEVAL_POINTERS control code.

```
typedef struct RETRIEVAL_POINTERS_BUFFER {
DWORD ExtentCount;
LARGE_INTEGER StartingVcn;
struct {
LARGE_INTEGER NextVcn;
LARGE_INTEGER Lcn;
};
__unnamed_struct_1935_64 Extents[1];
} RETRIEVAL_POINTERS_BUFFER, *PRETRIEVAL_POINTERS_BUFFER;
```

Accordingly, the RETRIEVAL_POINTERS_BUFFER structure can be used to determine a given allocation and location of a specific file, which can be used for comparison, as described herein.

At 208, the file information is stored in persistent file cache. For example, file information can be written to persistent cache 126 using cache logic engine 128. In one embodiment, RETRIEVAL_POINTERS_BUFFER is stored in persistent cache 126. In an embodiment, portions of the file itself can be stored in persistent cache 126.

At 210, a file change between system shutdown and system restart is tracked using the file information stored in persistent file cache. For example, one or more structures can be used in persistent cache 126 to determine a file change, such a file modification (write), a file deletion, or a new file creation.

In one aspect, if one or more modifications (e.g. within limits) in the USN journal are determined between two sessions, then, accordingly, the file is determined to be modified. In another aspect, the maps of the saved files from the incident(s) are extracted. In particular, a current actual map is extracted from the maps of the saved files and compared to the current map itself, in terms of topology, to see if it has changed in terms of extents. In another aspect, map content and map cache content can be compared for modifications.

In an example, part of tracking includes evaluation the EDR manager transferring multiple incidents. Embodiments compare maps between incidents and update the maps in the background in order to check consistency.

At 212, a remediation action including a request to remediate the file is received. For example, using input from behavior engine 114 and/or scan engine 116, remediation engine 118 can determine an appropriate remediation action to protect computing device 104 from the file operation. Remediation engine 118 can communicate the action request to remediation handlers via IPC engine 112.

At 214, remediation of the file using the file information stored in the PFC is performed. For example, remediation handlers 124 can implement the remediation action from remediation engine 118 for file protector 130 operation. In an embodiment, remediation of the file is conducted using the file information stored in the PFC, such as by using a copy of modified parts of the file from snapshots or backups.

In a first aspect, only the persistent file cache itself is utilized for remediation. In a second aspect, persistent file cache and a snapshot (e.g. snapshot data storage) is used. PFC can be used to determine that the file was modified, but a clean file is taken from the snapshot. In a third aspect, persistent file cache and a backup (e.g. backup data storage) is used. PFC can be used to determine that the file was modified, but a clean file is taken from the backup. The second and third aspects described above solve the PFC quota problem. Quota is the amount of space to store files, whether creating or accessing. PFC has a limited amount of space, due to its persistence characteristics being relatively high in resource expenditure, and such embodiments minimize the persistence storage needed.

Referring to FIG. 3, an example data structure for attribute entries in a USN journal is depicted, according to an embodiment. The information in this structure allows the system to track and monitor file changes in real time, and based on the flags for the type of change, it can be assessed whether a remediation process can be applied or if the file has undergone an unsafe modification requiring further actions like restoring from a backup. Referring also to FIG. 4, example data for the USN journal is depicted, according to an embodiment. These flag values are important in the decision-making process of the system. When changes flagged as unsafe (such as file deletion or encryption status changes) are detected, the system can determine that remediation using existing data is not feasible and initiate a process to retrieve the file from backup instead. This rule-based approach guarantees that only safe changes allow for remediation using cached or modified file data, while unsafe changes prompt more intensive recovery procedures.

In one aspect, bytes 40 to 43 include the reason for the change journal entry. Embodiments can determine both safe and unsafe changes based on the reason for the change journal entry. For example, file name change and object ID are safe and do not necessarily evidence a dangerous change between restarts. However, compression and encryption are unsafe and can evidence a dangerous change between restarts.

Figure 5:
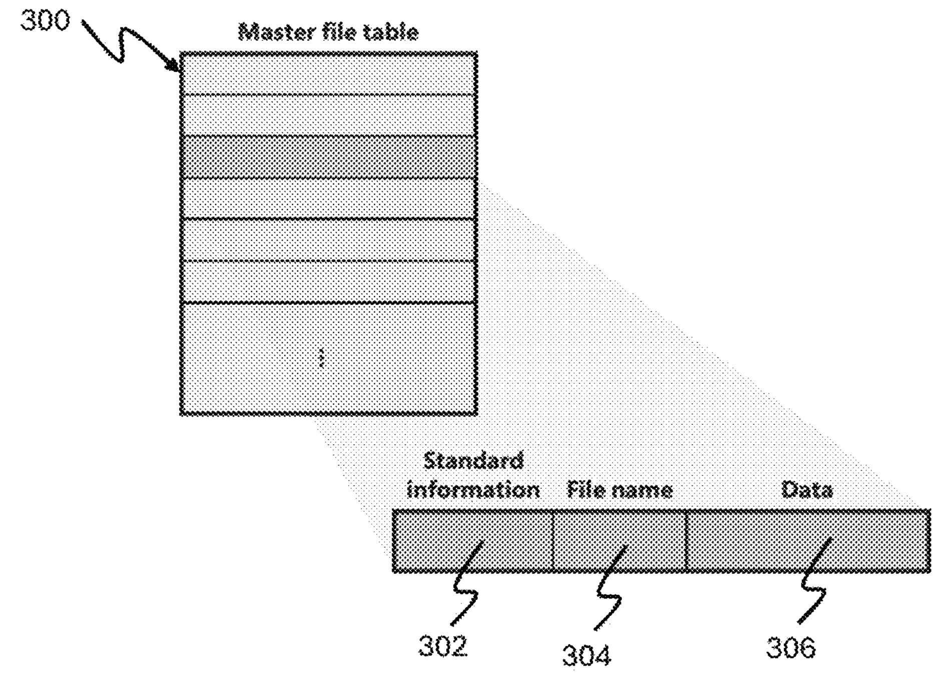
FIG. 5 is a block diagram of a master file table for a small file, according to an embodiment.

Referring to FIG. 5, a block diagram of a master file table 300 for a small file is depicted, according to an embodiment. Master file table 300 generally comprises standard information 302, file name 304, and data 306. In an embodiment, standard information 302 includes information such as timestamp and link count. In an embodiment, file name 304 comprises an attribute representative of the file name. In an embodiment, data 306 comprises the file data. In one aspect, data 306 for a "small" file comprises 1 kilobyte. In another aspect, data 306 for a "small" file comprises 4 kilobytes.

In one aspect, master file table 300 can be used for continuity tracking. MFT 300 stores metadata about files, including file size, timestamps, and other attributes. As illustrated in FIG. 5, each entry in MFT 300 contains standard information 302, file name 304, and data 306. For small files, all file data can reside entirely within the MFT entry, which allows efficient tracking. By comparing file references (e.g., file ID, sequence number) in MFT 300 before and after a system restart, the system guarantees that no changes have occurred to the file's essential structure or data. If the file ID and revision count remain unchanged, the system can continue tracking the file with confidence, maintaining continuity.

In one aspect, master file table 300 can be used for remediation. When a file change occurs, the MFT entry may contain critical data for remediation, especially in cases of small files stored entirely in MFT 300. During remediation, the system can retrieve the original file content from the MFT entry in persistent file cache (PFC), validating the file's integrity based on the stored file ID and sequence number. If the original data remains unchanged, it can be used directly for remediation, restoring the file to its prior state. This approach provides efficient use of resources by leveraging the MFT structure for fast recovery.

Figure 6:
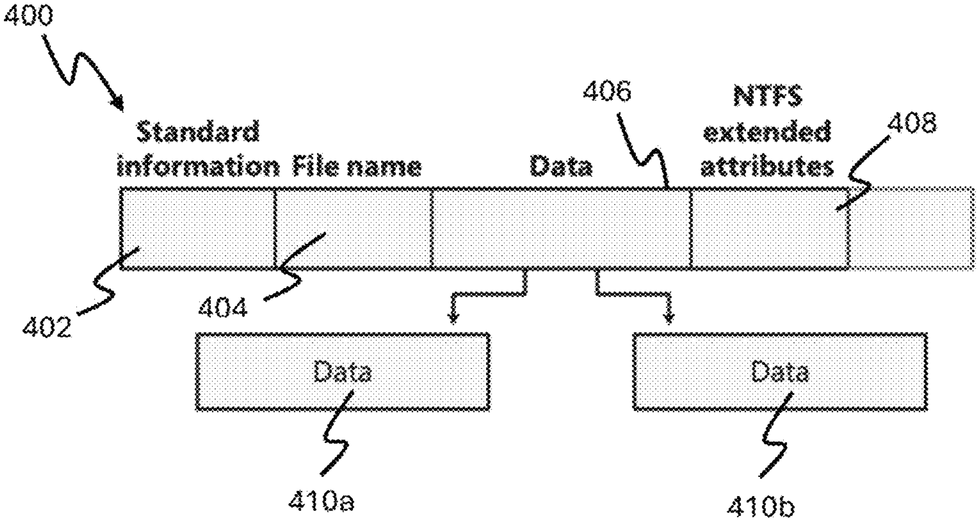
FIG. 6 is a block diagram of a master file table file for a large file with two data runs, according to an embodiment.

Referring to FIG. 6, a block diagram of a master file table file 400 for a large file with two data runs is depicted, according to an embodiment. Master file table 400 comprises standard information 402 and file name 404, which can respectively be substantially similar to standard information 302 and file name 304, data 406, and NTFS extended attributes 408, which can comprise various optional extensions such as quotas, reparse point data, and object identifiers.

With respect to data 406, as illustrated, two extents 410*a* and 41*b* are depicted. VCN is the virtual offset inside the file, and the offset on the volume is displayed at the bottom. Using this simple illustration, assumptions about how the data is stored and, which can then be reassembled together for remediation purposes. If some extent has changed from this set, then the old data is stored in the persistent file cache. Unchanged data continues to be stored in MFT 400 on the volume, and which can be extracted using this offset, and used for restoration. In this way, performance is improved in the process of snapshotting.

In one aspect, master file table 400 can be used for continuity tracking. MFT 400 is used to track files that are larger and more complex than those fully contained within a single MFT entry. In this case, the file's data is distributed across multiple extents 410*a* and 410*b*, which are mapped in the MFT. The standard information 402 and file name 404 are similar to MFT 300, but the data 406 is more extensive and may include NTFS extended attributes 408. Continuity tracking in this case involves comparing the extents'metadata, such as file ID and sequence number, to guarantee that the file's extents and their layout on the volume remain unchanged across sessions. If the extents are consistent, the system can confidently maintain continuity tracking, even if the file is fragmented across multiple locations.

In one aspect, master file table 400 can be used for remediation. For large files, remediation involves retrieving unchanged extents directly from the volume and using modified extents from the PFC. As shown in FIG. 6, extents 410*a* and 410*b* represent extents (runs) of the file's data that may be stored across different locations. If some extents remain unchanged, they are retrieved from the volume, while modified extents are pulled from the PFC. This hybrid approach ensures efficient file recovery by minimizing data redundancy. Additionally, the MFT stores metadata that helps the system identify which extents have been modified and need to be retrieved from the PFC for remediation.

Figure 7:
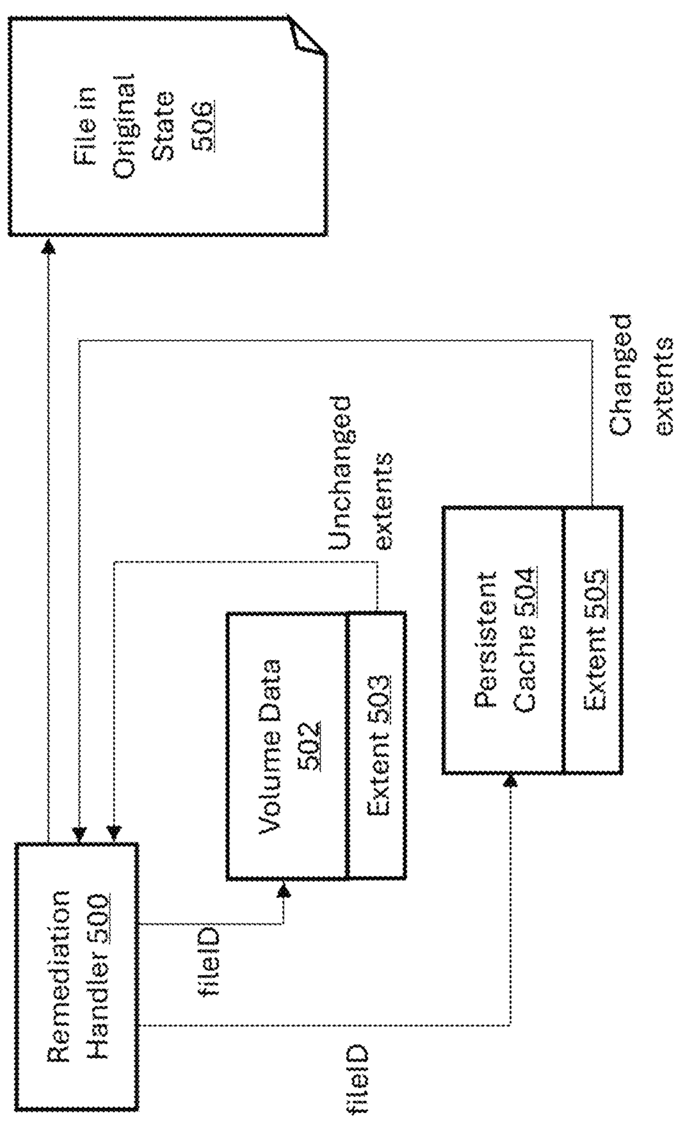
FIG. 7 is an operational block diagram of file recreation for file remediation, according to an embodiment The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

Referring to FIG. 7, an operational block diagram of file recreation for file remediation is depicted, according to an embodiment, for example, remediation handler 500, volume 502, and persistent file cache 504 are depicted (e.g. components of system 100). In one aspect, file recreation during remediation leverages data stored in the persistent file cache 504 and the volume 502 (or Master File Table) to efficiently reconstruct the file. PFC 504 acts as a database, where the key access identifier is the file reference (e.g., file ID) found in the USN journal or MFT. When a file is modified, the changed extents (runs) 505 are stored in PFC 504, while the unchanged extents (runs) 503 remain in their original locations on the volume 502 or are referenced in the MFT. During remediation, embodiments access PFC 504 to retrieve the changed extents (runs) 505 of the file. Further, the unchanged extents (runs) are located either from the volume or the MFT. The unchanged extents (runs) are pulled directly from volume 502 extents 503, while the changed extents (runs) 505 are retrieved from PFC 504, guaranteeing that only necessary data is processed, reducing system overhead. The system then combines the changed and unchanged extents (runs) to recreate the file in its original state 506, validating the data against the file ID and sequence number.

The invention claimed is:

1. A method of providing persistent file protection for a computing device, the method comprising:

intercepting a file operation for a file in a kernel mode;

determining file information associated with the file to be modified by the file operation, wherein the file information includes at least one of a file identifier, a file path, a file hash, a map of file extent locations, a file attribute, and an original file extent;

storing the file information in a persistent file cache (PFC), the PFC configured to store historical file operation information and comprising: a session cache portion that invalidates after computing device restart, and a persistent cache portion;

determining an incident associated with the file by an endpoint detection and response (EDR) manager;

after the computing device restarts:

tracking, in an update sequence number (USN) journal, a file change between computing device shutdown and computing device restart by enumeration of the USN journal to identify the file change, tracking a volume-level file allocation map by comparing a current file allocation map with the file allocation map stored in the persistent cache portion, and validating the volume-level file allocation map, receiving, from the EDR manager, a remediation action including a request to remediate the file, wherein the request is based on the incident; and performing remediation of the file using the file information stored in the persistent cache portion.

2. The method of claim 1, wherein tracking the volume-level file allocation map further comprises optimizing file storage including:

storing a file allocation map of original file content of file content associated with the file change in the persistent cache portion, and storing a file allocation map of only file content associated with the file change.

3. The method of claim 1, further comprising ensuring continuity of the tracking by comparing a master file table resident file to the file information stored in the persistent cache portion.

4. The method of claim 3, wherein comparing the master file table resident file to the file information includes comparing the entire master file table resident file including a standard information attribute, a file name attribute, and a data attribute.

5. The method of claim 1, wherein when a file extent is unmodified, the validation further comprises comparing a beginning topology to an end topology, and comparing a hash stored in the persistent cache portion and a hash of a file extent.

6. The method of claim 1, wherein the when a file extent is modified, the validation further comprises comparing a beginning topology to an end topology, wherein the remediation is performed using only the file information stored in the persistent cache portion.

7. The method of claim 1, wherein performing remediation of the file includes using original file content of modified portions and ignoring file content modified as part of the file change.

8. A system for persistent file protection, the system comprising:

a persistent file cache (PFC) in user mode, the PFC configured to store historical file operation information and comprising: a session cache portion that invalidates after computing device restart, and a persistent cache portion;

at least one processor and a memory and operably coupled to the at least one processor; instructions that, when executed by the at least one processor, cause the at least one processor to implement:

an EDR manager configured to determine an incident on a computing device, an EDR driver configured to intercept a file operation in a kernel mode based on the incident, a cache logic engine configured to store evidence of a file change between system shutdown and system restart on the persistent cache portion, a remediation engine configured to receive, from the EDR manager, a remediation action including a request to remediate the file, wherein the request is based on the incident and perform remediation of the file using the file information stored in the persistent cache portion by instructing one or more remediation handlers, and a file protector configured to determine the file change.

9. The system of claim 8, wherein the file protector is further configured to track an update sequence number (USN) journal to identify the file change by enumeration of the USN journal.

10. The system of claim 8, wherein the file protector is further configured to track a volume-level file allocation map to identify the file change by comparing a current file allocation map with a file allocation map stored in the persistent cache portion.

11. The system of claim 10, wherein the file protector is further configured to validate the volume-level file allocation map by comparing a hash stored in the persistent cache portion and an actual hash of the file.

12. The system of claim 10, wherein tracking the volume-level file allocation map further comprises optimizing file storage including:

storing a file allocation map of original file content of file content associated with the file change in the persistent cache portion, and storing a file allocation map of only file content associated with the file change.

13. The system of claim 8, wherein the file protector is further configured to ensure continuity of the evidence of the file change by comparing a master file table resident file to the file information stored in the persistent cache portion.

14. The system of claim 13, wherein comparing the master file table resident file to the file information includes comparing the entire master file table resident file including a standard information attribute, a file name attribute, and a data attribute.

15. The system of claim 8, wherein storing the file information in the PFC is based on a storage rule.

16. The system of claim 14, wherein the storage rule includes at least one of a mask rule, a directory rule, or a file importance rule.

17. The system of claim 8, wherein performing remediation of the file includes using original file content and ignoring file content associated with the file change.

18. A non-transitory computer-readable storage medium storing instructions that, when executed by at least one processor, cause the at least one processor to implement a file protector implemented in kernel mode, the file protector to provide persistent protection of a file, including:

comparing file information for the file stored in a persistent file cache (PFC) to an update sequence number (USN) journal;

identifying a change to the file between system shutdown and system restart based on the compare;

conducting a hash comparison by:

hashing a volume-level file map including a file extent before restart as a pre-restart hash and storing the pre-restart hash in the PFC, and upon restart, hashing the volume-level file map as a post-restart hash, comparing the pre-restart hash and the post-restart hash; and determining continuity tracking can resume safely based on the hash comparison.

19. The non-transitory computer-readable storage medium of claim 18, wherein the hash comparison is conducted on at least two file section extents.

20. The non-transitory computer-readable storage medium of claim 18, wherein the instructions further cause the at least one processor to:

conduct a topology comparison by comparing a pre-restart topology of start and end points of the file extent and a post-restart topology of start and end points of the file extent, wherein determining continuity tracking can resume safely is further based on the topology comparison.

* * * * *